T. F. McNAIR.
CULTIVATOR.
No. 191,458. Patented May 29, 1877.
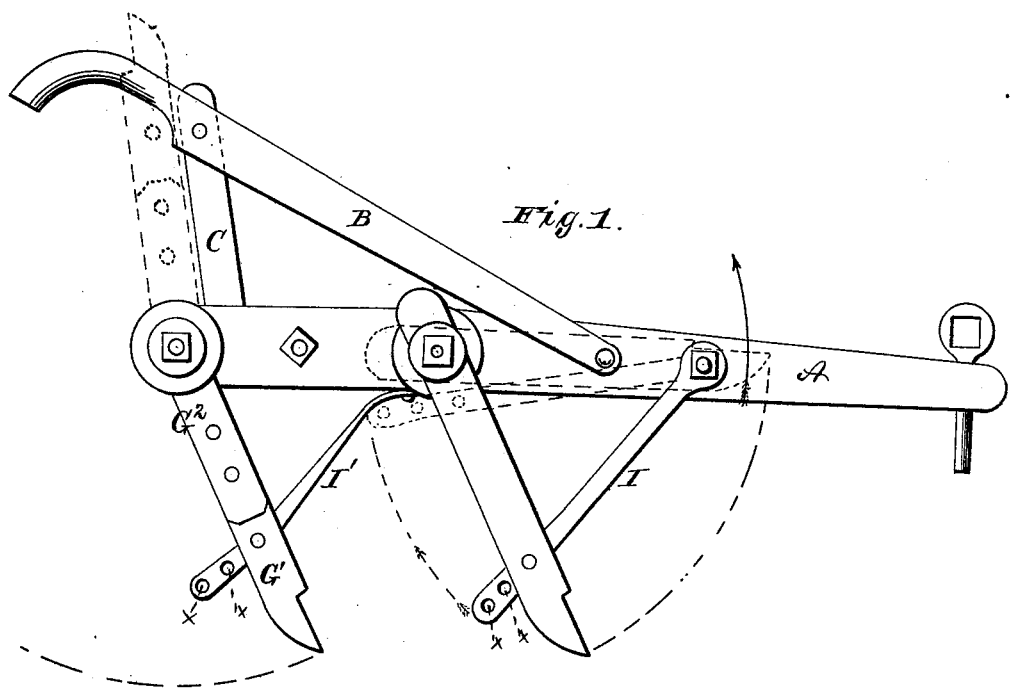
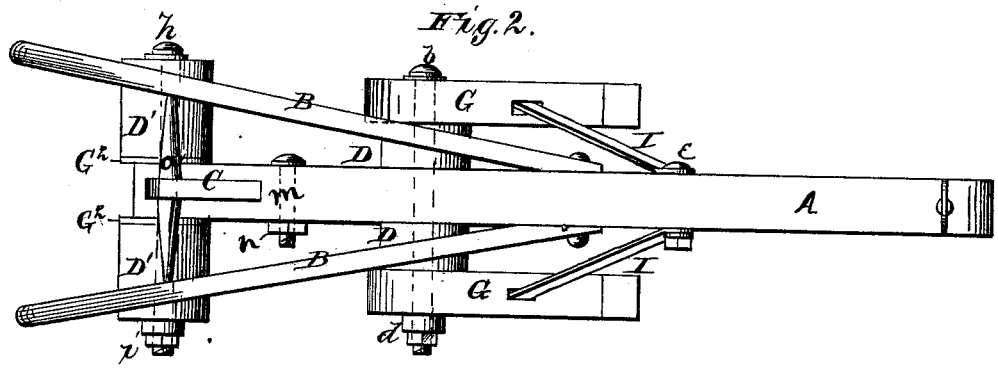
WITNESSES
Franck L. Durand
Frank Galt
INVENTOR
Thos F. McNair
Alexander Mason
ATTORNEYS

UNITED STATES PATENT OFFICE.

THOMAS F. McNAIR, OF WORTHVILLE, GEORGIA.

IMPROVEMENT IN CULTIVATORS.

Specification forming part of Letters Patent No. 191,458, dated May 29, 1877; application filed April 23, 1877.

*To all whom it may concern:*

Be it known that I, THOMAS F. McNAIR, of Worthville, in the county of Butts, and in the State of Georgia, have invented certain new and useful Improvements in Cultivators; and do hereby declare that the following is a full, clear, and exact description thereof, reference being had to the accompanying drawing, and to the letters of reference marked thereon, making a part of this specification.

The nature of my invention consists in the construction and arrrangement of a cultivator, as will be hereinafter more fully set forth.

In order to enable others skilled in the art to which my invention appertains to make and use the same, I will now proceed to describe its construction and operation, referring to the annexed drawing, in which—

Figure 1 is a side elevation, and Fig. 2 is a plan view, of my improved cultivator.

A represents the plow-beam, and B B the handles secured thereto, and supported by a cross-bar, $a$, through the standard C on the rear end of the beam.

At a suitable point on the beam A is passed a bolt, $b$, through the same, and on this bolt, on each side of the beam, is placed a collar, D, and the plow-feet G, a nut, $d$, upon the end of the bolt holding the parts firmly together.

In the lower part of each plow-foot is a mortise for the passage of a brace, I, which is pivoted at its front end to the side of the beam by a bolt, $e$, passing through the beam and through both braces.

In the rear end of each brace I is a series of holes, $x$, for holding the plow-foot at any angle desired by the insertion of a break-pin through either of said holes behind the foot. This break-pin then holds the plow-foot at the desired angle, and at the same time prevents injury to the plow when meeting obstructions by said pin breaking.

At the rear end of the beam is a third plow-foot, $G^1$, provided on its sides with plates $G^2$ $G^2$, which extend upward, one on each side of the beam, and are pivoted thereto by a bolt, $h$. On this bolt are also placed collars $D'$ $D'$, and the whole fastened by a nut, $i$, on the end of the bolt. This plow-foot $G^1$ is also held at any desired angle by a break-pin through a perforated brace, $I'$.

When thus constructed, the cultivator can be used in a variety of ways for many different purposes; as, for instance, as shown in the drawing, two plows in front and one in rear; or, by changing the plow-feet, one in front and two in rear.

The rear plow may be thrown out of the way and the two front ones only used. In that case the two front plows may be arranged one in front of the other, on opposite sides of the beam.

Or the two front plows may be thrown up out of the way and held by simply tightening the nut $d$, and the rear plow only used.

Or the three plows may be arranged at different places on the beam.

$m$ is a bolt passing through the beam at a point between the bolts $d$ and $h$, and provided with a nut, $n$, to be used in making some of the changes referred to.

I do not broadly claim plow-standards that are adjustable and interchangeable on the plow-beam, as I am aware that such is not new.

Having thus fully described my invention, what I claim as new, and desire to secure by Letters Patent, is—

1. The combination, with the beam A and pivoted braces I I, perforated at their rear ends, of the slotted interchangeable plow-feet G G, connected to the beam by the bolt $d$, and capable of being folded on a line with the beam and there secured, substantially as and for the purposes herein set forth.

2. The plow-foot $G^1$, pivoted to the rear extremity of the beam A, and capable of being thrown upward when not in use, as set forth.

In testimony that I claim the foregoing I have hereunto set my hand this 20th day of April, 1877.

T. F. McNAIR.

Witnesses:
 FRANK GALT,
 HENRY N. MILLER.